No. 701,157. Patented May 27, 1902.
H. S. CREDLEBAUGH.
SPEED REGULATING CLUTCH.
(Application filed June 27, 1901.)
(No Model.)

UNITED STATES PATENT OFFICE.

HENRY S. CREDLEBAUGH, OF NEW CARLISLE, OHIO, ASSIGNOR OF ONE-HALF TO W. F. BOHLANDER, OF PHONETON, OHIO.

SPEED-REGULATING CLUTCH.

SPECIFICATION forming part of Letters Patent No. 701,157, dated May 27, 1902.

Application filed June 27, 1901. Serial No. 66,269. (No model.)

*To all whom it may concern:*

Be it known that I, HENRY S. CREDLEBAUGH, a citizen of the United States, residing at New Carlisle, in the county of Clark and State of Ohio, have invented certain new and useful Improvements in Speed-Regulating Clutches; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in speed-regulating clutches for driving machines at uniform speeds from a machine or driver in which the speed is not uniform—for example, a dynamo.

The object of the invention is to provide a governor or automatic controlling device for preventing an overrunning of the dynamo and a consequent injury to the same due to burning out. This object is accomplished through the use of a governor or clutch device, which is placed upon the shaft of the dynamo and is subject to the control of spring tension and centrifugal force. For example, when the driving-machine, which may be a gas or gasolene engine, is running at variable speed, as in the case of an automobile-engine, the speed transmitted to the dynamo will be very nearly, if not absolutely, uniform. This is due to the amount of frictional pressure between the clutch devices on the dynamo-shaft, as will be more fully described.

The invention has for its prime object to dispense with the use of primary or storage batteries for obtaining the initial spark in starting the engine.

The invention is especially adapted to take the place of storage batteries in furnishing the initial spark and is intended for small dynamos, where a small amount of power is required to be transmitted. In this class of dynamos, as they are turned out by the manufacturers, there is a limited space on the shaft which is not utilized ordinarily, but which is utilized by the present invention, which comprises a clutch device hereinafter described. In order to utilize this small space on the dynamo-shaft, which is not more than a half-inch, or thereabout, it is necessary to make the clutch devices of very compact form.

Preceding a detail description of my invention reference is made to the accompanying drawings, of which—

Figure 2:
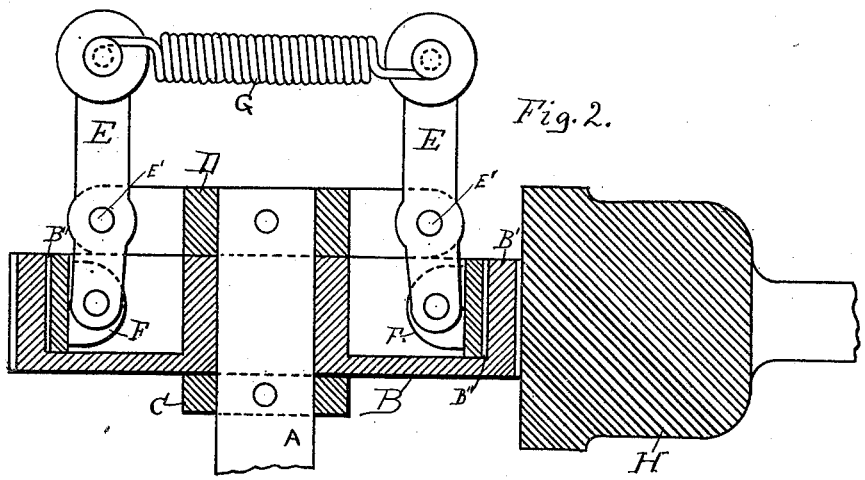
Figure 1:
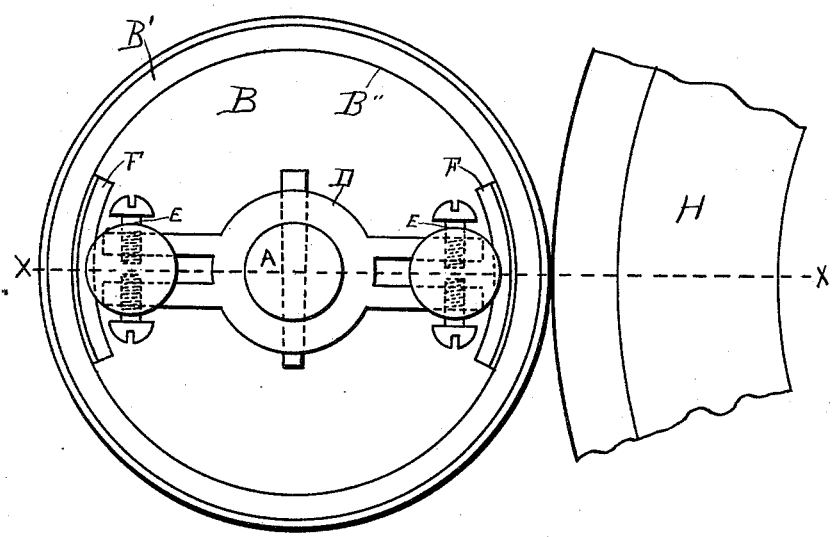

Figure 1 is an elevation of my improved speed-regulating clutch. Fig. 2 is a sectional view thereof.

Similar reference characters indicate corresponding parts in both views of the drawings.

A designates a shaft, which is broken away in the drawings. This is the shaft of a dynamo, which is not shown in the drawings.

B is a pulley which is loosely mounted on said shaft. This pulley may be a friction-wheel, gear-wheel, or belt-wheel. The said wheel B has a rim B' projecting on one side thereof, which provides an inner periphery B''.

C is a collar which is rigidly attached to the shaft A on one side of said wheel.

D is the hub of a clutch-collar. This clutch-collar is rigidly attached to the shaft A on the other side of the wheel B, so that the said wheel is inclosed between the collar C and the hub D.

E designates two clutch-arms, which are pivoted to the clutch-collar at E'. F designates friction-shoes pivoted to said clutch-arms and engaging with the inner periphery B'' of the wheel B. The clutch-arms have governor-balls E'' on their outer ends, which are connected by coil-spring G, which normally holds the arms in positions to effect engagements between the shoes F and the pulley. When the speed of the shaft A is below a certain point, the clutch-arms E are under the control of the spring G, and a tight contact is made between the shoes F and the pulley; but as the speed of said shaft increases from the driving-wheel H centrifugal force overcomes the tension of the spring and will cause a disengagement between the friction-shoes F and the wheel, thereby relieving the shaft A from the influence of the pulley B. The wheel H is a fly-wheel of a gas or gasolene engine. (Not shown.) This wheel, as shown in the drawings, drives the pulley B at all times; but power is only transmitted from said wheel H to shaft A when the clutch-arms E are under the control of spring G, as will be readily understood.

In many dynamos now in use which employ an electric battery to obtain an initial spark a change to other means—for example, to a gas-engine—for obtaining such initial spark cannot be made without the substitution of a dynamo with a longer shaft than is provided with the dynamo usually placed upon the market; but by means of my invention such change may be made without dispensing with the dynamo used in connection with the electric batteries. This is owing to the compactness of the clutch devices. The pulley B is provided with an internal hub, which is of the same width as the flange of the pulley. Therefore it does not take up any space of the shaft A, which could be otherwise utilized. This leaves a suitable space for the clutch-collar D, to which the arms E are pivoted, said arms projecting beyond the extreme end of the shaft.

Having described my invention, I claim—

In a speed-regulating clutch, the combination of a shaft to be driven, a wheel loosely mounted on said shaft, a collar at one side of said wheel, a clutch-collar inclosing the other side of said wheel, clutch-arms pivoted to said clutch-collar, friction-shoes pivoted to said clutch-arms and projected on the interior of the wheel where they are adapted to engage the inner surface of said wheel, and a coil-spring controlling said clutch-arms and effecting an engagement of the friction-shoes with the inner surface of the wheel at such times when the tension of said spring is not overcome by the centrifugal force due to the movement of the shaft, substantially as specified.

In testimony whereof I affix my signature in presence of two witnesses.

HENRY S. CREDLEBAUGH.

Witnesses:
R. J. McCARTY,
JOHN W. KALBFUS.